United States Patent [19] [11] 3,943,159
Quiring et al. [45] Mar. 9, 1976

[54] PROCESS FOR THE PRODUCTION OF TELOMERS CONTAINING ISOCYANATE GROUPS

[75] Inventors: Bernd Quiring, Leverkusen; Kuno Wagner, Leverkusen-Steinbuechel, both of Germany

[73] Assignee: Bayer Aktiengesellschaft, Leverkusen, Germany

[22] Filed: Nov. 9, 1973

[21] Appl. No.: 414,575

[30] Foreign Application Priority Data
Nov. 16, 1972 Germany............................ 2256104

[52] U.S. Cl.... 260/453 P; 204/159.24; 260/2.5 AT; 260/77.5 AT; 260/77.5 CR; 260/239 A; 260/248 NS; 260/326.45; 260/453 A; 260/453 AB; 260/453 AL; 260/453 AR; 260/465 D; 260/465.4; 260/468 E; 260/471 C; 260/475 SC; 260/479 C; 260/485 J; 260/488 H

[51] Int. Cl.$^2$...................................... C07C 118/00
[58] Field of Search............ 260/453 P; 204/159.24

[56] References Cited
UNITED STATES PATENTS
3,654,106    4/1972    Wagner et al. ................ 204/159.23

*Primary Examiner*—Lewis Gotts
*Assistant Examiner*—Dolph H. Torrence
*Attorney, Agent, or Firm*—Joseph C. Gil; Gene Harsh

[57] ABSTRACT

An improved process for the preparation of isocyanate group containing telomers of reduced viscosity by conducting the telomerization of an ethylenically unsaturated monomer with an organic isocyanate in the presence of an organic compound containing at least one sulfhydryl group.

3 Claims, No Drawings

PROCESS FOR THE PRODUCTION OF TELOMERS CONTAINING ISOCYANATE GROUPS

This invention relates to a process for the preparation of telomers which contain isocyanate groups and to the telomers obtainable by this process.

Telomers which are synthesized from a telogen consisting of mono- and polyisocyanates which still contain at least one hydrogen atom, preferably in the $\alpha$-position to the NCO-group, or which contain alkyl or alkylene groups attached to aromatic rings and from a taxogen consisting of one or more olefinically unsaturated compounds have already been described in U.S. Pat. No. 3,654,106. The isocyanate group-containing telomers prepared according to this patent have, however, the disadvantage of a very irregular molecular weight distribution. Owing to their relatively high molecular weight portions, the products obtained by the process of the patent and their solutions have viscosities which are too high for many purposes.

It has now been found that this disadvantage can, to a large extent, be overcome by carrying out the telomerization in the presence of organic compounds which contain at least one sulfhydryl group.

Although it is known that products which have a low molecular weight are obtained when the radical polymerization of olefinically unsaturated monomers is carried out in the presence of mercaptans, it was to be assumed that since mercaptans react with isocyanate groups to form thiourethanes, the thiol groups would be in practice completely blocked because of the large number of isocyanate groups present in the reaction mixture as well as the high reaction temperatures which frequently occur, and would, therefore, no longer be available for chain transfer. It was, therefore, extremely surprising that organic compounds which contain sulfhydryl groups would have a pronounced regulating action in the presence of such a large isocyanate excess, especially if the reaction were carried out for several hours at a temperature above 100°C.

This invention, therefore, relates to a process for the preparation of telomers which contain isocyanate groups by the telomerization of ethylenically unsaturated monomers, using organic mono- and/or polyisocyanates as telogen in the presence of heat and/or high-energy radiation and/or chemical radical-forming agents, which process is characterized in that the telomerization is carried out in the presence of an organic compound which contains at least one sulfhydryl group.

The invention also relates to telomers obtainable by this process.

In principle, any organic compound which contains at least one sulfhydryl group is suitable for the process according to the invention. Illustrative of this type material are compounds of the general formula

R—SH in which R represents a $C_1 - C_{18}$ alkyl group, a $C_2 - C_{18}$ alkenyl group, a $C_4 - C_{15}$ cycloalkyl group, a $C_4 - C_{15}$ cycloalkenyl group, a $C_6 - C_{15}$ aryl group, a $C_7 - C_{15}$ aralkyl group or a heterocyclic group which, in addition to 2–10 carbon atoms, contains 1–3 nitrogen atoms and/or 1—3 oxygen atoms and/or 1–3 sulphur atoms and wherein R can also contain halogen, hydroxyl, carboxyl, ether, ester, alkoxysilane, thioether or sulfhydryl groups as substituents.

Polyethers, polythioethers or polyesters which contain sulfhydryl groups are also suitable sulfhydryl compounds for the process according to the invention.

Examples of sulfhydryl compounds suitable for the process according to the invention are described in Houben-Weyl, "Methoden der Organischen Chemie", Thieme-Verlag Stuttgart, XIV, 1 (1963), pages 66 et seq and 321 et seq. The following are examples: n-butyl mercaptan, tert.-butyl mercaptan, n-amyl mercaptan, n-dodecyl mercaptan, tert.-dodecyl mercaptan, hexadecyl mercaptan, propane-2-thiol, pentadecane-8-thiol, 1-mercaptomethyl naphthalene, tert.-methanethiols, 3-ethoxypropanethiol, ethanedithiol, $\beta$-(ethylthio)-ethyl mercaptans, trimethylenedithiol, decane-1,10-dithiol, cyclohexyl mercaptan, cyclohexenyl mercaptan, mercaptobenzothiazole, thioglycollic acid, ethylthioglycolate, $\beta$-mercaptopropionic acid, $\gamma$-mercaptopropyl trimethoxysilane, 2-mercaptoethanol, 1-mercapto-2-hydroxypropane, 2-mercapto-1-hydroxypropane, 1-mercapto-2-hydroxy-n-butane, 2-mercapto-3-hydroxy-n-butane, 1-mercapto-4-hydroxy-n-butane and 1-mercapto-4-hydroxy-n-butene.

Compounds which contain in addition to the mercapto group a substituent which is reactive with NCO-groups are particularly advantageous regulating agents. The following are examples of such compounds: thioglycollic acid, $\beta$-mercaptopropionic acid, 2-mercaptoethanol, 1-mercapto-2-hydroxypropane, 2-mercapto-1-hydroxypropane, 1-mercapto-2-hydroxy-n-butane, 2-mercapto-3-hydroxy-n-butane, 1-mercapto-4-hydroxy-n-butane and 1-mercapto-4-hydroxy-n-butene. They increase the yield of the grafting reaction, as represented e.g. in an idealized form in the following equations. By yield of grafting reaction is meant the ratio of vinyl monomers bound in the form of a telomer to the total quantity of vinyl monomers which are polymerized in the course of telomerization. In the reaction scheme below, $R_1$ represents a hydrocarbon radical which preferably contains additional isocyanate groups and $R_2$ represents a hydrocarbon radical, for example of a mercapto alcohol.

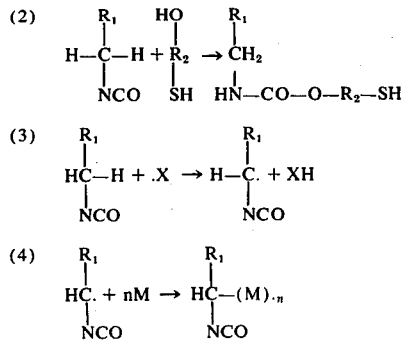

(5) 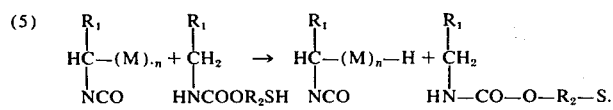

(6) 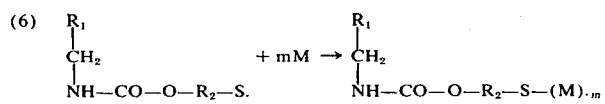

(7) 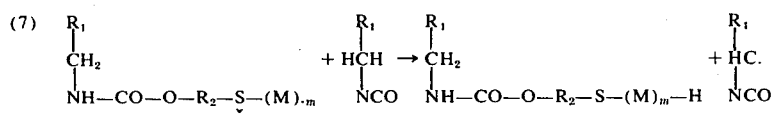

In the above equations X. represents any radical formed during the reaction, while M represents the vinyl monomer. The sequence in which reactions (2) and (5–7) take place can also be reversed.

The telogens used in the proces according to the invention are preferably those mono- or polyisocyanates which contain an aliphatically bound hydrogen atom in the $\alpha$-position to at least one NCO-group, but the process according to the invention can also be carried out with aromatic polyisocyanates which can, for example, carry alkyl substituents on the aromatic ring. The preferred mono- or polyisocyanates used for the process according to the invention are those of the general formula $$Q(NCO)_n$$

in which $n$ represents an integer of from 1 to 4, preferably 2 or 3, and

Q represents an aliphatic hydrocarbon radical containing from 1–18 carbon atoms, a cycloaliphatic hydrocarbon radical containing from 4–15 carbon atoms or an araliphatic hydrocarbon radical containing from 7–15 carbon atoms, which radicals can consist of several segments which can be linked together, for example by ester, urethane, urea, allophanate, uretdione, biuret or isocyanurate groups.

The following are examples of suitable mono- or polyisocyanates for the process according to the invention: hexyl isocyanate, dodecyl isocyanate, stearyl isocyanate, tetramethylene-1,4-diisocyanate, pentamethylene-1,5-diisocyanate, hexamethylene-1,6-diisocyanate, 2,2,4- and 2,4,4-trimethyl-1,6-diisocyanatohexane, dodecamethylene-1,12-diisocyanate, 2,3-diisocyanatocaproic acid methyl ester, 1,2-diisocyanatocyclobutane, dicyclohexyl-4,4′-diisocyanate, dicyclohexylmethane-4,4′-diisocyanate, p- and m-xylylene diisocyanate, 1-methyl-2,4-diisocyanato-cyclohexane, 1-isocyanato-3,3,5-trimethyl-5-isocyanatomethyl-cyclohexane, dimeryl diisocyanate as well as any dimers with uretdione groups or trimers with isocyanurate groups formed from these isocyanates. Triisocyanates are also suitable, e.g. allophanate triisocyanates as well as biuret triisocyanates which can be prepared from the above mentioned diisocyanates, e.g. according to U.S. Pat. No. 3,124,605, and addition products of the above mentioned diisocyanates with difunctional and/or polyfunctional alcohols, amines or carboxylic acids and mercaptans, e.g. the addition products of 2 mols of diisocyanate and 1 mol of ethylene glycol, propane-1,2-diol, 2,2-dimethylpropane-1,3-diol, butane-1,3-diol, butane-1,4-diol, 2-ethylhexane-1,3-diol, N-methyl diethanolamine, N-methyl dipropanolamine, 2-methylaminoethanol, 3-ethoxy propylamine, cyclohexylamine, N-(2-hydroxyethyl)-cyclohexylamine or 1-cyclohexylaminopropanol-(2) and the addition products of 3 mols of diisocyanate and 1 mol of trimethylolpropane or glycerol.

The addition products of the above mentioned diisocyanates and triisocyanates with higher molecular weight polyols, polyamines and polycarboxylic acids such as polyester polyols, polyether polyols, aminofunctional polymers and polymers which contain hydroxyl and/or carboxyl groups can also be used, in which case at least 0.8 mols of polyisocyanate is used per gram equivalent of the functional groups.

Polymers and copolymers of the above mentioned diisocyanates with aromatic diisocyanates are also suitable, e.g. those which contain about 40% of hexamethylene-1,6-diisocyanate and about 60% of 1-methylbenzene-2,4-diisocyanate, i.e. polyisocyanates which contain isocyanurate rings. The polyisocyanates which can be prepared according to U.S. Pat. No. 3,647,848 are also suitable telogens.

As already described above, aromatic polyisocyanates which contain alkyl substituents can also be used for the process according to the invention. 2,4- and 2,6-diisocyanato-toluene and mixtures of these isomers, triisopropylbenzene diisocyanates and 4,4′-diisocyanatodiphenylmethane, etc. are examples of such polyisocyanates. Modification products of the aromatic polyisocyanates of the type described above can also be used for the process according to the invention. Isocyanates which contain blocked isocyanate groups can also be used. By blocked isocyanates are meant the known reaction products of isocyanates, e.g. with phenol, caprolactam, oximes, etc. Pure aromatic polyisocyanates, e.g. phenylene diisocyanates or naphthylene-1,5-diisocyanate, can be used in the process according to the invention either as mixtures with the above mentioned isocyanates which contain aliphatic groups or on their own. If used on their own, however, it is advisable to use regulating agents which in addition to a sulfhydryl group also contain a group which is reactive with NCO-groups.

In many cases in which removal of the monomeric isocyanates is not necessary in view of the application for which the products are intended, the process according to the invention can also advantageously be carried out with polyisocyanates which are in the process of formation. Thus, for example, the preparation of N,N′,N″-tris-(isocyanatohexyl)-biuret and other biurets from polyfunctional isocyanates and suitable polyamines or the preparation of addition products of 2 or 3 mols of a bifunctional diisocyanate and 1 mol of a bifunctional or trifunctional polyol or the polymerization of polyisocyanates to isocyanurates can be coupled according to the invention with the preparation of telomers by reacting the olefinically unsaturated compounds with the polyisocyanates which are in the process of formation in the presence of radical-forming agents and mercaptans. Similarly, the preparation e.g. of biuret polyisocyanates from aliphatic, cycloaliphatic or araliphatic diisocyanates and tert. butanol can be coupled with the process according to the invention, the biuret polyisocyanate which are in the process of formation then functioning as telogens in the polymerization reaction.

Diisocyanates or triisocyanates are preferably used as telogens for the process according to the invention.

Preparation of the products can, of course, be carried out with solutions of the mono- and polyisocyanates in inert organic solvents such as benzene, toluene, xylene, chlorobenzene, benzonitrile, nitrobenzene, dichlorobenzene commercial mixtures of aromatic solvents generally boiling from about 150°C to about 200°C., ethyl acetate, ethyl glycol acetate or butyl acetate.

Any olefinically unsaturated compound which is capable of radical polymerization can be used as taxogen for the process of the invention. The following are mentioned as examples: ethylene, vinyl acetate, vinyl propionate, vinyl butyrate, methyl acrylate, ethyl acrylate, butyl acrylate, methyl methacrylate, vinyl chloride, vinylidene chloride, acrylonitrile, vinyl toluene, $\alpha$-methyl styrene, 2-chlorobutadiene, 2,3-dichlorobutadiene, butadiene, isoprene, methyl vinyl ketone, methyl isopropenyl ketone, N-vinyl pyrrolidone and methyl vinyl sulphone.

Acrylic acid esters, methacrylic acid esters, vinyl chloride, styrene, chlorobutadiene, 2,3-dichlorobutadiene and vinyl esters are particularly suitable.

Suitable pairs of monomers or ternary monomeric systems which are capable of copolymerization can, of course, be used for the invention. The following are examples of particularly suitable systems: styrene/methyl acrylate, styrene/butyl acrylate, styrene/methyl methacrylate, styrene/acrylonitrile, methyl acrylate/styrene, ethylene/vinyl acetate, vinyl chloride/vinyl acetate, methyl acrylate/2-chlorobutadiene, styrene/maleic acid anhydride and esters.

Ternary comonomer mixtures can also be used for the process of the invention, e.g. styrene/methyl methacrylate/vinylidene chloride, styrene/acrylonitrile/vinylidene chloride and styrene/methyl methacrylate/acrylonitrile.

According to a particular advantageous method of carrying out the process of the invention, proportions from about 0.1 to about 15 mol% and preferably from about 0.5 to about 10 mol%, based on the total quantity of taxogens, of olefinically unsaturated monomers which contain reactive groups, preferably OH—, NH$_2$—, COOH—, NCO— or epoxy groups, can be built into the telomers. The incorporation of vinyl isocyanate, $\beta$-isocyanatoethyl methacrylate or allyl isocyanate has the effect, for example, of increasing the NCO functionality of the products. The following are examples of copolymerizable monomers which contain OH- or COOH-groups: $\beta$-hydroxyethyl methacrylate, $\beta$-hydroxypropyl methacrylate, $\beta$-hydroxypropyl acrylate, acrylic acid, acrylamide and methacrylamide. A certain quantity, generally up to about 15 mol%, of acrylamide- or methacrylamide-N-methylolmethylether or the reaction products of methoxymethyl isocyanate and $\beta$-hydroxyalkyl acrylates or $\beta$-hydroxyalkyl methacrylates may also be added. When using such aliphatic, araliphatic and cycloaliphatic isocyanates whose NCO-groups are relatively inert to tert. bases, it is permissible to add monomers which contain basic groups, such as N-(3-dimethylaminopropyl)-acrylamide or methacrylic acid N,N-dimethyl hydrazide. Polymerizable monomers which contain epoxy groups, e.g. the glycidyl esters of acrylic and methacrylic acid, may also be included.

Particularly suitable radical-forming agents for the process according to the invention are those organic nitrogen compounds which tend to undergo radical decomposition because the use of these compounds results in telomers with maximum color fastness. The following are examples of such nitrogen compounds: $\alpha,\alpha'$-azoisobutyric acid dinitrile, $\alpha,\alpha'$-azoisobutyric acid dimethyl ester and $\alpha,\alpha,'$-azo- ($\alpha,\gamma$-dimethyl)-valeric acid dinitrile. Acyl peroxides such as benzoyl peroxide and lauryl peroxide or alkyl hydroperoxides such as tert. butyl hydroperoxide, cumene hydroperoxide and 1,1'-dihydroxy-dicyclohexylperoxide can also be used.

The radical-forming agents are generally used in quantities of between about 0.05 and about 6% by weight, preferably at least about 0.3 and less than about 3% by weight, based on the quantity of monomers.

Monomers such as styrene which are readily polymerized by heat and/or high-energy radiation will react in accordance with the invention even without the addition of radical-forming agents.

The process according to the invention can also be carried out with photochemical stimulation but it is generally preferable to work with radical-forming agents and optionally to use UV-light in addition, if desired in combination with photosensitizers such as cerium-(IV) salts, uranyl acetyl, benzoin derivatives or Michlers ketone, etc. Increased conversion of the vinyl monomers by about 5 to 15% is often achieved by this combined process.

To carry out the process according to the invention, the olefinically unsaturated monomers are reacted with the mono- or polyisocyanates in the presence of compounds which contain sulfhydryl groups and radical-forming agents and/or with application of heat and/or high-energy radiation at temperatures of between about 15° and about 250°C, preferably at least about 30° and especially at least about 50°. It is also preferred to employ temperatures of less than about 200°C and especially less than about 150°C. Pressures can be from 0 to about 300 atmospheres.

The process is generally carried out at elevated temperature although temperatures about room temperature can be employed in special cases and if, for example, it is not necessary to obtain maximum yields.

The process according to the invention can be carried out both with and without solvents. The molar ratios of telogen to taxogen employed according to the invention are not critical and can vary within wide limits, e.g. between about 20:1 and 1:50.

According to one embodiment of the process, for example, the mono- or polyisocyanate and regulating agent and the ethylenically unsaturated polymerizable monomer are brought together without a solvent. A large excess of the telogen is used at the beginning of the reaction, e.g. about 3 to 8 mols, preferably 4 to 5 mols per 0.1 mol of taxogen, so that at the end of telomerization 1 to 6 mols of telogen and preferably 3 to 4 mols are still present and the telomer is dissolved at a concentration of 50 to 60% by weight in the excess telogen. Completely uncross-linked, readily soluble mono- or polyisocyanates are thereby obtained which can easily be freed from monomeric isocyanates which have not taken part in the telomerization reaction by evaporation in a thin-layer evaporator or by extraction with organic solvents or by column chromatography.

If it is desired to obtain higher molecular weight telomers containing NCO-groups as reaction products, the concentration of telogen should be reduced, e.g. only 0.2 to 1 mol of telogen is in that case used per 10 to 50 mols of taxogen. In that case, it is advantageous to carry out the reaction in inert solvents such as benzene, toluene, xylene, ethyl glycol ether acetate, chlorobenzene, o-dichlorobenzene, benzonitrile or nitrobenzene.

According to one special variation of the process which is particularly advantageous, if the ratio by weight of taxogen to telogen in the reaction product is about 1:1 or higher than 1:1 the regulating agent used according to the invention can be introduced dropwise or portionwise as a solution in the taxogen into the reaction vessel during the telomerization reaction.

One method of carrying out the process according to the invention which is frequently chosen and which is particularly advantageous enables the NCO-functionality of the telomers to be increased, as already mentioned above, as well as adding NCO-groups to all the homopolymer portions which are free from NCO-groups. This is achieved by adding small proportions of comonomers which contain functional groups, e.g. vinyl monomers which contain NCO-, hydroxy-, amide-, N-methylolalkyl ether or acid groups when carrying out the telomerization reaction. Telomers with increased NCO-functionality are thereby obtainable because the aforesaid functional groups react with the polyisocyanate telogens which in this embodiment of the process are preferably used in large excess, so that for example one NCO-functional derivative is obtained for each OH—, $NH_2$-, COOH— or other functional group which has been built in. It is particularly worth noting that this variation of the process can be used for obtaining polyisocyanate telomers with a high functionality which are readily soluble and very fluid in the thin layer evaporator so that they can be freed from monomeric telogens without undergoing cross-linking.

In all the variations of the process of the invention described above, the sulfhydryl compounds used as regulating agents according to the invention are added in quantities of from about 0.01 to about 10% by weight, preferably from about 0.1 to about 6% by weight, based on the vinyl monomers.

The description of the products of the process as "telomers" is justified by the analytical findings and especially by the presence of NCO-groups in the products of the process which have been freed from monomeric monoisocyanate or polyisocyanate, for example by thin-layer distillation, by the resulting ease with which the products of the process can be converted into polyaddition products with polyamines or polyfunctional hydroxyl compounds and by the IR-spectroscopic data and in particular the nuclear resonance spectrum of the products, according to which the band associated with the $\alpha$-hydrogen atoms of the isocyanates put into the process is considerably attenuated.

The products of the process are distinguished from telomers of the known art U.S. Pat. No. 3,654,106 by their considerably lower viscosity, as has been described above.

The products of the process can be used for any known addition and polyaddition reactions, e.g. for the preparation of polyurethane or polyurea lacquers or coatings. They constitute excellent adhesives, e.g. for compound glass, and are also suitable for producing foam resins of all kinds. The products of the process based on aliphatic, cycloaliphatic and araliphatic polyisocyanates and acrylates or methacrylates are particularly suitable for the production of lacquers which have maximum lightfastness and resistance to discoloration in heat. Products obtained by using monoisocyanates as telogen are, for example, valuable plasticizers, stabilizers and textile auxiliary agents which to some extent may also be used for these purposes in the absence of free isocyanate groups.

The process according to the invention will now be described more fully with the aid of the following examples. The parts given in the examples are parts by weight unless otherwise indicated.

EXAMPLES

Example 1 (Comparison Example)

The procedure of this example is conducted in a three-necked flask equipped with thermometer, reflux cooler, stirrer, nitrogen inlet tube and dropping funnel, which dropping funnel is cooled to a temperature of about 12° to 14°C. To the flask is charged a solution having a two-component solute comprising as the first component 112.5 parts of a commercial addition product of 3 mols of hexamethylene diisocyanate and 1 mol of trimethylolpropane, which has an NCO content of 17.5%, and as the second component 37.5 parts of a commercial addition product of 2 mols of hexamethylene diisocyanate and 1 mol of 2-ethylhexane-1,3-diol, which has an NCO-content of 16.2%, in 224 parts of a three component solvent mixture of (1) xylene, (2) a commercial mixture of aromatic solvents boiling in the range from 155 to 180°C, and (3) ethyl glycol acetate in proportions of 2:2:1. This solution is heated to 125°C in a nitrogen atmosphere with the exclusion of moisture. To this heated solution in the flask there is added, via the dropping funnel, a cooled mixture of 119 parts of methyl methacrylate, 4 parts of $\beta$-hydroxy-propyl methacrylate and 2.4 parts of $\alpha,\alpha'$-azodiisobutyronitrile. This mixture is added dropwise over the course of 2 hours at a rate sufficient to maintain the reaction mixture at a temperature of 125°C. At the end of this 2 hour period and after addition of the cooled mixture, the entire reaction mixture is stirred for another 30 minutes. The reaction mixture is then subjected to distillation at a sump temperature of 125°C under a light vacuum so as to distill off 214 parts, which distillate contains 28% of the methyl methacrylate added to the reaction. To the residue from the distillation, which residue is free from vinyl monomers, is added 214 parts of the solvent mixture described above. This mixture is then stirred until a homogeneous, clear, almost colorless solution is obtained. This solution has a viscosity of 780 cP (20°C) and an NCO-content of 4.25%.

Example 2

The procedure is the same as described in example 1. About 112.5 parts of the addition product of 3 mols of hexamethylene diisocyanate and 1 mol of trimethylolpropane, 37.5 parts of the addition product of 2 mols of hexamethylene diisocyanate and 1 mol of 2-ethylhexane-1,3-diol, 0.49 parts of 2-mercaptoethanol and 224 parts of the solvent mixture used in example 1 are introduced into the reaction vessel and a mixture of 119 parts of methyl methacrylate, 4 parts of β-hydroxypropyl methacrylate and 2.4 parts of α,α'-azodiisobutyronitrile is added dropwise.

About 200 parts, which contain 22% of the methyl methacrylate put into the process, are then distilled off and replaced by an equal quantity of the solvent mixture. The clear, almost colorless solution has an NCO-content of 4.2% and a viscosity of 476 cP at 20°C and, therefore, has a more than 40% lower viscosity than the solution prepared according to example 1, taking into account the higher proportion of methyl methacrylate which has been reacted.

Part of the solution is diluted with xylene to a solids content of 35% and 0.1% of dibutyl tin dilaurate (based on the solids content) is added. A lacquer solution is obtained which, when sprayed onto test plates of glass or sheet steel, gives rise to dust-dry, clear films after 30 minutes. These films are cross-linked by reaction with atmospheric moisture and after cross-linking they are characterized by great hardness, elasticity and abrasion resistance as well as high resistance to organic solvents such as xylene and ethyl glycol acetate.

Example 3

The procedure is the same as that described in example 2. Instead of mercaptoethanol, however, an equal quantity of n-dodecyl mercaptan is used. About 191 parts, which contain 23% of the methyl methacrylate put into the process, are distilled off, and after dilution of the distillation residue with an equal quantity of the solvent described in example 1, a clear solution which has an NCO-content of 4.2% and a viscosity of 483 cP determined at 20°C is obtained.

Example 4

The procedure is the same as that described in example 2. Commercial tris-(isocyanatohexyl)-biuret (NCO-content approximately 22%) is used instead of the addition product of 3 mols of hexamethylene diisocyanate and 1 mol of trimethylolpropane, and 1.23 parts of 2-mercaptoethanol are used instead of 0.49 parts, and distillation is carried out at a reaction temperature and sump temperature of 120°C.

About 193 parts, which contain 20% of the methyl methacrylate put into the process, are distilled off and replaced by the solvent mixture described in example 1. A clear, pale-yellow solution which has an NCO-content of 5.4% and a viscosity of 284 cP at 20°C is obtained.

Example 5

A mixture of 119 parts of methyl methacrylate, 4.1 parts of β-hydroxypropyl methacrylate, 2.46 parts of 2-hydroxyethyl mercaptan and 2.4 parts of α,α'-azodiisobutyronitrile cooled to about 14°C is introduced dropwise in the course of 4½ hours into a solution of 112.5 parts of a commercial addition product of 3 mols of hexamethylene diisocyanate and 1 mol of trimethylol-propane and 37.5 parts of the commercial addition product of 2 mols of hexamethylene diisocyanate and 1 mol of 2-ethylhexane-1,3-diol in 224 parts of the solvent mixture described in example 1 at a temperature of 90°C and under a nitrogen atmosphere with exclusion of moisture. Stirring is then continued for 30 minutes at the same temperature. About 190 parts, which contain 10.7% of the methyl methacrylate put into the reaction, are then distilled off at 100°C under a light vacuum. The distillation residue is free from monomeric methyl methacrylate and is diluted with 190 parts of the solvent mixture described in example 1. A clear, almost colorless solution which has an isocyanate content of 4.2% and a viscosity of 602 cP at 20°C is obtained.

Example 6

Example 2 is repeated with the only exception that the 0.49 parts of 2-mercapto ethanol are replaced by
a. 0.72 parts of 1-mercapto-2-hydroxy propane;
b. 0.61 parts of β-mercapto propionic acid and
c. 0.53 parts of thioglycolic acid.

The clear almost colorless solutions thus obtained exhibit following NCO-contents and viscosities at 20°C:
a. 4.1 % by weight of NCO, 495 cP;
b. 3.98 % by weight of NCO, 510 cP;
c. 3.85 % by weight of NCO, 475 cP.

Example 7

Example 2 is again repeated with the only exception that the mercapto ethanol is replaced by following compounds:
a. 0.69 parts by weight of 1-mercapto-2-hydroxy-n-butane;
b. 0.88 parts by weight of thioglycolic acid ethyl ester;
c. 0.95 parts by weight of thioglycolic acid butyl ester.

The solutions obtained exhibit following NCO-contents and viscosities at 20°C:
a. 4.3 % by weight of NCO, 480 cP;
b. 4.05 % by weight of NCO, 510 cP;
c. 3.95 % by weight of NCO, 490 cP.

Example 8

Example 2 is again repeated with the only exception that the mercapto ethanol is replaced by following mercapto compounds:
a. 0.78 parts by weight of cyclohexyl mercaptane;
b. 0.65 parts by weight of phenyl mercaptane;
c. 0.95 parts by weight of naphthyl mercaptane and
d. 0.87 parts by weight of benzyl mercaptane.

The solutions obtained exhibit following NCO-contents and viscosities at 20°C:
a. 3.95 % by weight of NCO, 548 cP;
b. 4.15 % by weight of NCO, 580 cP;
c. 4.05 % by weight of NCO, 590 cP;
d. 4.25 % by weight of NCO, 478 cP.

what is claimed is:

1. In the process for the production of an isocyanate group containing telomer by telomerization of an ethylenically unsaturated monomer as taxogen and an organic isocyanate as telogen with heating and optionally in the presence of high energy radiation and/or chemical radical-forming agents, the improvement which comprises conducting the telomerization in the presence of from about 0.1 to about 10% by weight based upon the ethylenically unsaturated monomer, of an organic compound containing at least one sulfhydryl group.

2. The process of claim 1 wherein the sulfhydryl group containing compound also contains, in addition to the sulfhydryl group, another substituent which is reactive with NCO groups.

3. The process of claim 1 wherein the organic compound containing a sulfhydryl group has the formula

R—SH in which R is a $C_1$ to $C_{18}$ alkyl group, a $C_{12}$ to $C_{18}$ alkenyl group, a $C_4$ to $C_{15}$ cycloalkyl group, a $C_4$ to $C_{15}$ cycloalkenyl group, a $C_6$ to $C_{15}$ aryl group, a $C_7$ to $C_{15}$ aralkyl group or a heterocyclic group which, in addition to from 2 to 10 carbon atoms, contains from 1 to 3 nitrogen atoms and/or from 1 to 3 oxygen atoms and/or from 1 to 3 sulfur atoms and in which R can also contain halogen, hydroxyl, carboxyl, ether, ester, alkoxysilane, thioether or sulfhydryl groups as substituents.

* * * * *